L. A. JOHNSON.
Thill Coupling.
No. 101,467. Patented April 5, 1870.
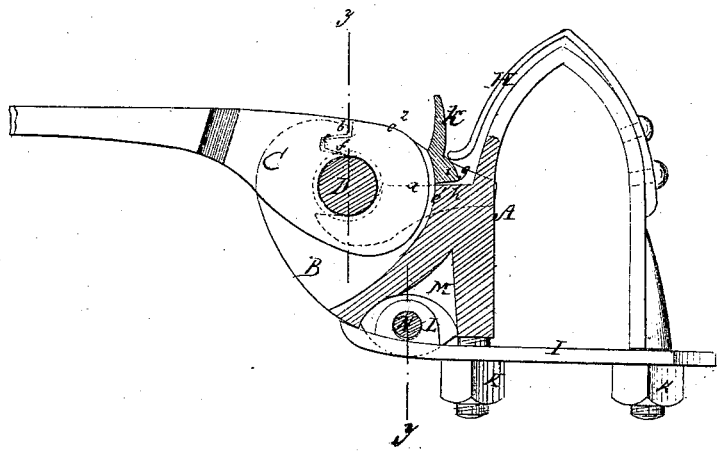
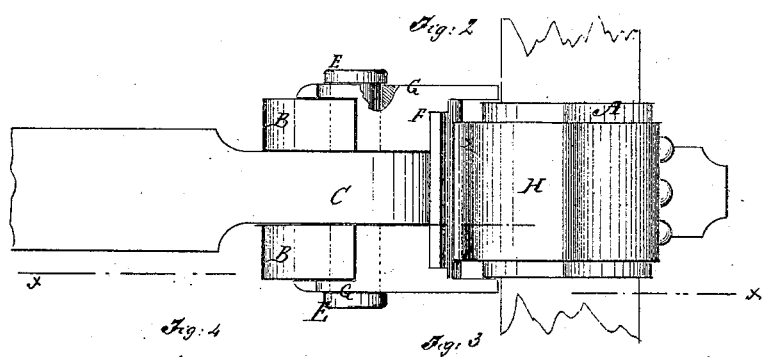
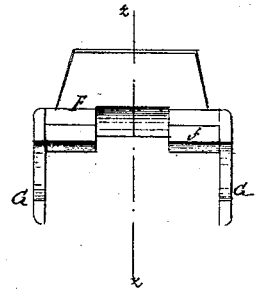 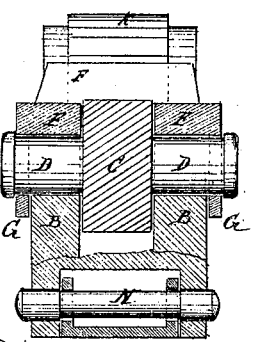 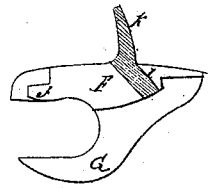
Witnesses:
Chas. Nida
D. S. Mabee
Inventor:
L. A. Johnson
Per Munn & Co
Attorneys.

United States Patent Office.

LEONARD A. JOHNSON, OF CANDOR, NEW YORK.

Letters Patent No. 101,467, dated April 5, 1870.

IMPROVED CARRIAGE-CLIP.

The Schedule referred to in these Letters Patent and making part of the same.

*To all whom it may concern:*

Be it known that I, LEONARD A. JOHNSON, of Candor, in the county of Tioga and State of New York, have invented a new and improved Carriage-Clip; and I do hereby declare that the following is a full, clear, and exact description thereof, which will enable others skilled in the art to make and use the same, reference being had to the accompanying drawings forming part of this specification.

This invention relates to improvements in clips for the attachment of shafts and poles of light carriages to the axles; and It consists in an improved arrangement of open boxes or bearings in the ears of the clips for the trunnions or journals of the shaft or pole, a detachable cap, and a spring for holding them in place.

It also consists in an arrangement of the detachable plate, which connects the two ends of the yoke below the axle, to prevent it from falling off in case the nuts on the screw-threaded ends of the yoke work off.

Figure 1 is a longitudinal sectional elevation through my improved carriage-clip, the section being taken on the line $x\ x$ of fig. 2;

Figure 2 is a plan view of the same.

Figure 3 is a transverse section on the line $y\ y$ of fig. 1;

Figure 4 is a front elevation of the cap; and

Figure 5 is a section through the cap, taken on the line $z\ z$ of fig. 4.

Similar letters of reference indicate corresponding parts.

A is the yoke, which is fitted to the axle in the usual way.

B are the ears, between which the metallic shank C, which is attached to the shaft or pole, works, and which furnish the bearings for the trunnions or journals D of the said shank.

The journals in this case are permanently attached to the shank by fitting tightly in the hole in the shank, by screwing in or otherwise, and the ends which are to project beyond the cap have collars E.

These journals are let into the bearings through openings in the top of the ears, indicated by the dotted lines $a\ b$.

The wall of the line $b$ in each ear is notched, as shown at $e$.

F is the cap for engaging with the ears for holding the journals in place.

It is provided with projections $f$, which take into the notches $e$, and seats down at $g$ on the plane face $h$ behind the recess for the shank C.

It is also provided with the flanges G, which fit down at the outside of the ears and against the journals behind the collars E.

These flanges G prevent any end movement of the journals, in case they work loose in the shank C.

H is a flat spring, attached to the yoke at the rear, and springing over the top and down to a position behind the cap F, where the end bears in a groove in the said back, above the rib $i$ and below the flange $k$, in a way to hold the cap firmly in position, the rib $i$ preventing the cap from escaping from the spring.

The cap is placed in position by engaging the points $f$ with the notches $e$, and then forcing the heel down, so as to spring the end of the spring H above the rib $i$ into the groove.

For removing the cap, a stick of wood is forced in between the spring and the flange K, forcing the spring back and the cap up.

The walls of the bearings in the ears for the trunnions below the notches $e$, the wall $e^1$ at the rear of the recess, between the ears for the shank C, and the said shank C are so shaped that the trunnions cannot be removed from the bearings until the shanks C are turned up high enough to bring the reduced part $e^2$ of the shank down to the wall $e^1$, so that, although the cap may work loose and escape, the shafts cannot drop out while geared to the horse.

To retain the plate I, which connects the ends of the yoke under the axle in case the nuts K work loose and drop off, I have provided the lugs L in the upper side, projecting into the recess M between the ears, through which lugs are eyes for a bolt, N, passing through them and through the ears B. This bolt is made smaller between the ends than it is thereat, and the plate is sprung upward when the bolt is inserted, and allowed to spring back, so that the lugs draw hard down upon the reduced part of the bolt, and thereby prevent the escape of the bolt laterally, so that, no matter whether the nuts K escape or not, the plate will be retained.

Having thus described my invention,

I claim as new and desire to secure by Letters Patent—

1. The combination of the shank C, provided with the trunnions or journals, as described, the ears B, with receive-openings at the top to the bearings, the cap F, and spring H, all substantially as specified.

2. The combination, with the ears B and shank C, of the journal, provided with collars, and the cap F, and flanges G thereon, substantially as described.

3. The spring H, in combination with the cap F, provided with projections $f$, fitting the notches $e$ in the ears B, and with the rib $i$ and flange K, all constructed and operating as and for the purpose specified.

4. Securing the spring plate I on the screwed ends of the yoke by means of the perforated lugs L, bolt N, and the ears B, all arranged substantially as specified.

The above specification of my invention signed by me this 31st day of December, 1869.

LEONARD A. JOHNSON.

Witnesses:
GEORGE W. MABEE,
ALEX. F. ROBERTS.